Figure 1:
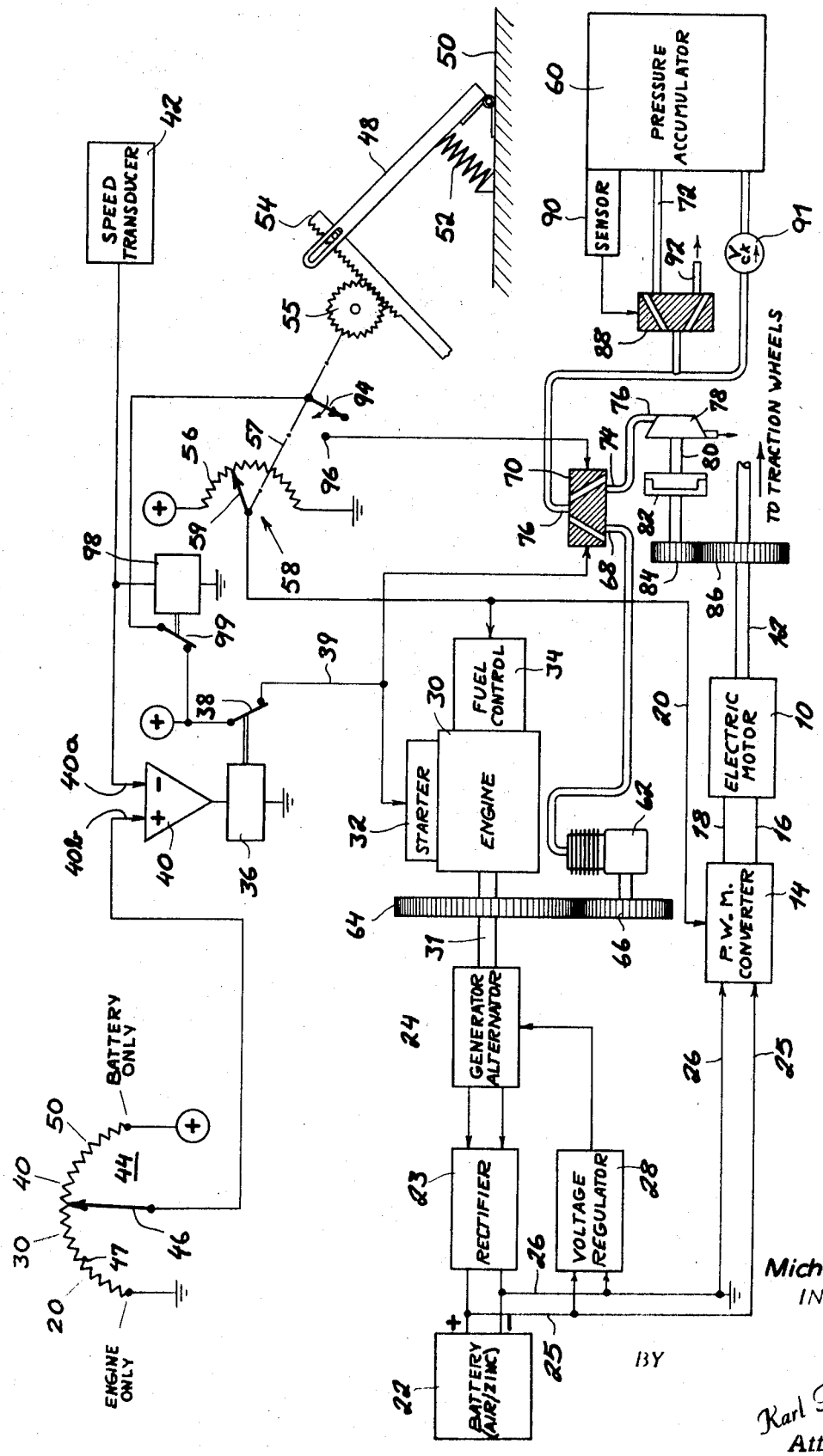

United States Patent
Yardney

[15] 3,650,345
[45] Mar. 21, 1972

[54] CONTROL SYSTEM FOR ALTERNATELY BATTERY-OPERATED AND ENGINE-POWERED VEHICLE

[72] Inventor: Michel N. Yardney, 366 Central Park West, New York, N.Y. 10025

[22] Filed: Dec. 9, 1969

[21] Appl. No.: 883,462

Related U.S. Application Data

[63] Continuation-in-part of Ser. No. 710,347, Mar. 4, 1968, Pat. No. 3,503,464.

[52] U.S. Cl. ..................................180/65 A, 290/16, 290/17
[51] Int. Cl. ...........................................B60l 11/12, B80l 11/14
[58] Field of Search ......................180/65; 290/16, 9, 10, 11, 290/12, 13, 14, 15, 17, 18, 19, 20, 21, 4; 105/50

[56] References Cited

UNITED STATES PATENTS

| | | | |
|---|---|---|---|
| 1,124,736 | 1/1915 | Heany | 290/4 C |
| 1,275,201 | 8/1918 | Beach | 180/65 UX |
| 1,790,635 | 1/1931 | Arendt | 180/65 UX |
| 2,544,606 | 3/1951 | Mallory | 180/66 B |
| 3,367,438 | 2/1968 | Moore | 180/65 A |

*Primary Examiner*—Benjamin Hersh
*Assistant Examiner*—Milton L. Smith
*Attorney*—Karl F. Ross

[57] ABSTRACT

Automotive vehicle of the hybrid-powered type wherein the traction wheels are driven at low speeds by electric energy stored in a battery and at high speeds by an internal-combustion engine simultaneously recharging the battery. The engine, when running, may also load a mechanical force storer, such as an air pressure accumulator, used to assist in the starting of the vehicle to conserve battery power; in the absence of such a stored force, the engine is used for starting and then ceases to operate until a certain minimum speed is reached.

16 Claims, 3 Drawing Figures

Michel N. Yardney
INVENTOR.

BY
Karl F. Ross
Attorney

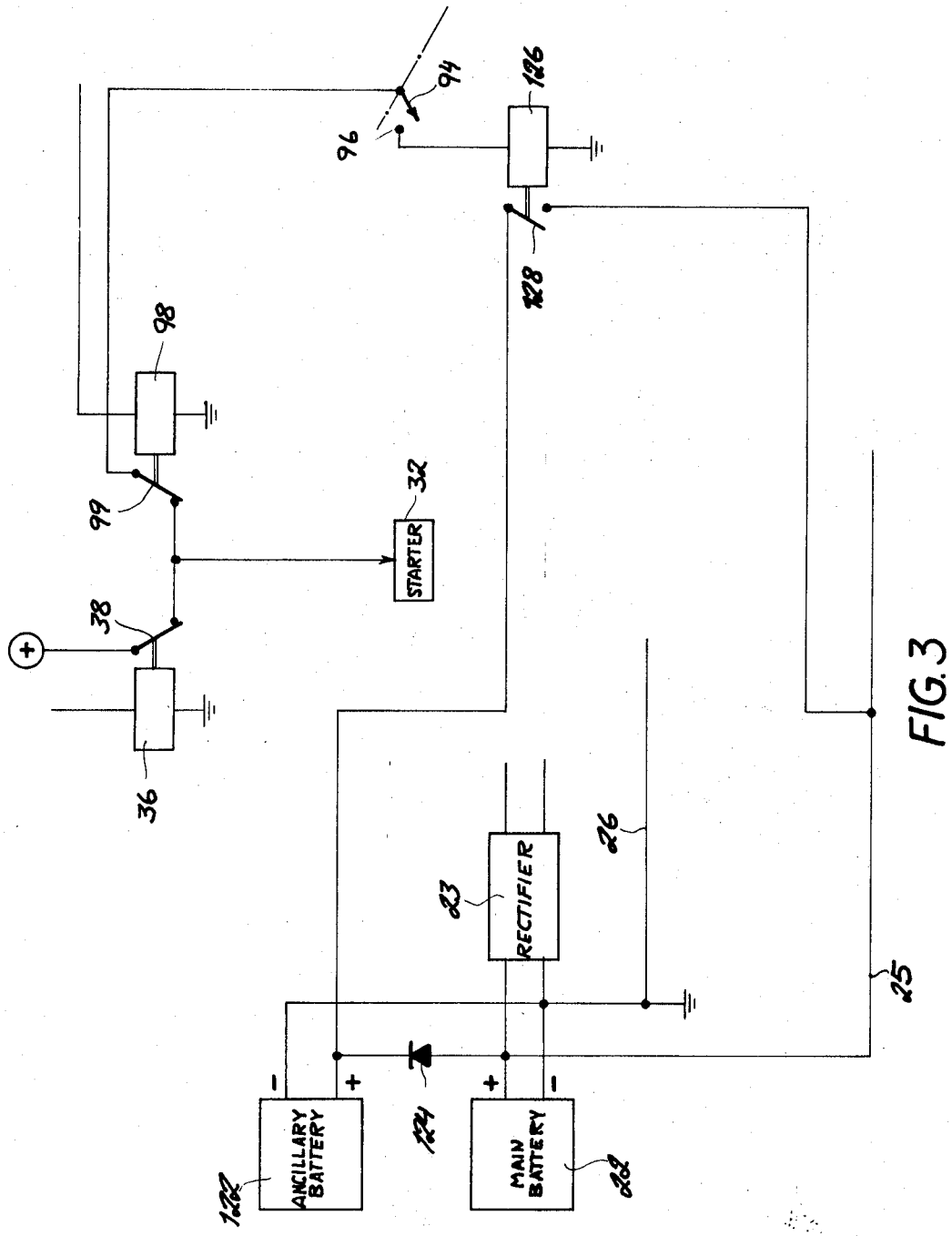

CONTROL SYSTEM FOR ALTERNATELY BATTERY-OPERATED AND ENGINE-POWERED VEHICLE

This application is a continuation-in-part of my copending application Ser. No. 710,347 filed Mar. 4, 1968, now U.S. Pat. No. 3,503,464.

In the above-identified application, I have disclosed a hybrid-type vehicle which at high speeds (i.e., on the open road) is driven by a hydrocarbon-fueled engine, in the conventional manner, and at relatively low speeds operates on the power of an electric storage battery to prevent the pollution of city air when driving in congested traffic. The engine, when operating, also recharges the battery by powering an electric generator connected thereto; in a preferred embodiment disclosed in that application, the power train of the vehicle includes an electric motor having its input connected in parallel with the battery terminals across the generator output so as to intervene at all speeds in the transmission of torque to the traction wheels.

As further described in my copending application, the system advantageously includes means for selectively presetting the speed limit at which a switchover from battery drive to engine drive (during acceleration) or vice versa (during deceleration) occurs. In the extreme positions of the speed selector, driving may be entirely by battery (e.g., on a rapid-transit city street) or exclusively by the engine (e.g., on a crowded country road).

Although, in principle, any type of storage battery could be used for the operation just described, the construction of a hybrid vehicle of this character has become practical only with the advent of large-capacity storage batteries capable of delivering the necessary ampere-hours while occupying but limited space. Prominent among such electrochemical energy generators are the alkaline batteries, notably those of the silver-zinc type. These batteries are also capable of generating, for a short time, a large current as needed to set the vehicle in motion. The relatively high cost of batteries containing silver as an active material, however, suggests the desirability of an alternate and less expensive electrochemical energy source for this purpose. Such an energy source is available in the form of a gas/metal battery, e.g., one of the air/zinc type, in which a consumable negative electrode coacts with a non-consumable gas-depolarizable positive electrode.

While the storage capacity of such gas/metal batteries is quite satisfactory for the purpose contemplated, their maximum discharge rate is limited so that difficulties are experienced in starting an automotive vehicle from standstill by the battery output alone. Even with other types of batteries, the large starting torque required causes a considerable energy drain which may exhaust the battery before the vehicle has gathered enough speed to let the engine take over.

It is, therefore, the general object of my present invention to provide a further improvement of the system disclosed in my copending application whereby little or no energy is drawn from the electrochemical generator or storage battery for starting the vehicle.

A related object is to provide means for assisting the propulsion battery in driving the vehicle under certain operating conditions, e.g., from standstill or during uphill travel.

These objects are realized, pursuant to my present invention, by a modification of the previously disclosed system according to which the battery output is supplemented or supplanted under high-load conditions at low speeds, e.g., during starting, by energy from another source.

Since the start of a vehicle generally takes a short time, it will not materially contribute to the pollution of the ambient air if this supplemental energy is taken from the engine itself (even if the latter is of the internal-combustion type), provided of course that the engine is promptly deactivated as the vehicle begins to move at low speed. Yet this relatively minor contamination of the atmosphere can also be obviated if, according to another feature of my invention, the supplemental energy is obtained from a mechanical force storer or an ancillary electrochemical energy source which is then reloaded or recharged by the engine after the latter has become operative at a higher vehicular velocity. Such a stored force or energy could also be used to assist the propulsion battery in accelerating the vehicle or overcoming a rise in terrain when the engine is cut off.

An ancillary electrochemical energy source suitable for this purpose may be a conventional, preferably rechargeable battery of the aforementioned high-discharge-rate type (e.g., Ag/Zn, Ni/Cd, Ni/Fe) dimensioned for relatively low storage capacity.

The mechanical force storer could be a solid elastic element, such as a spring, but preferably consists of a volume of gas compressed in a pressure accumulator. Ambient air may serve as the gas which is compressed by an engine-driven pump during normal, i.e., batteryless, driving.

Figure 2:
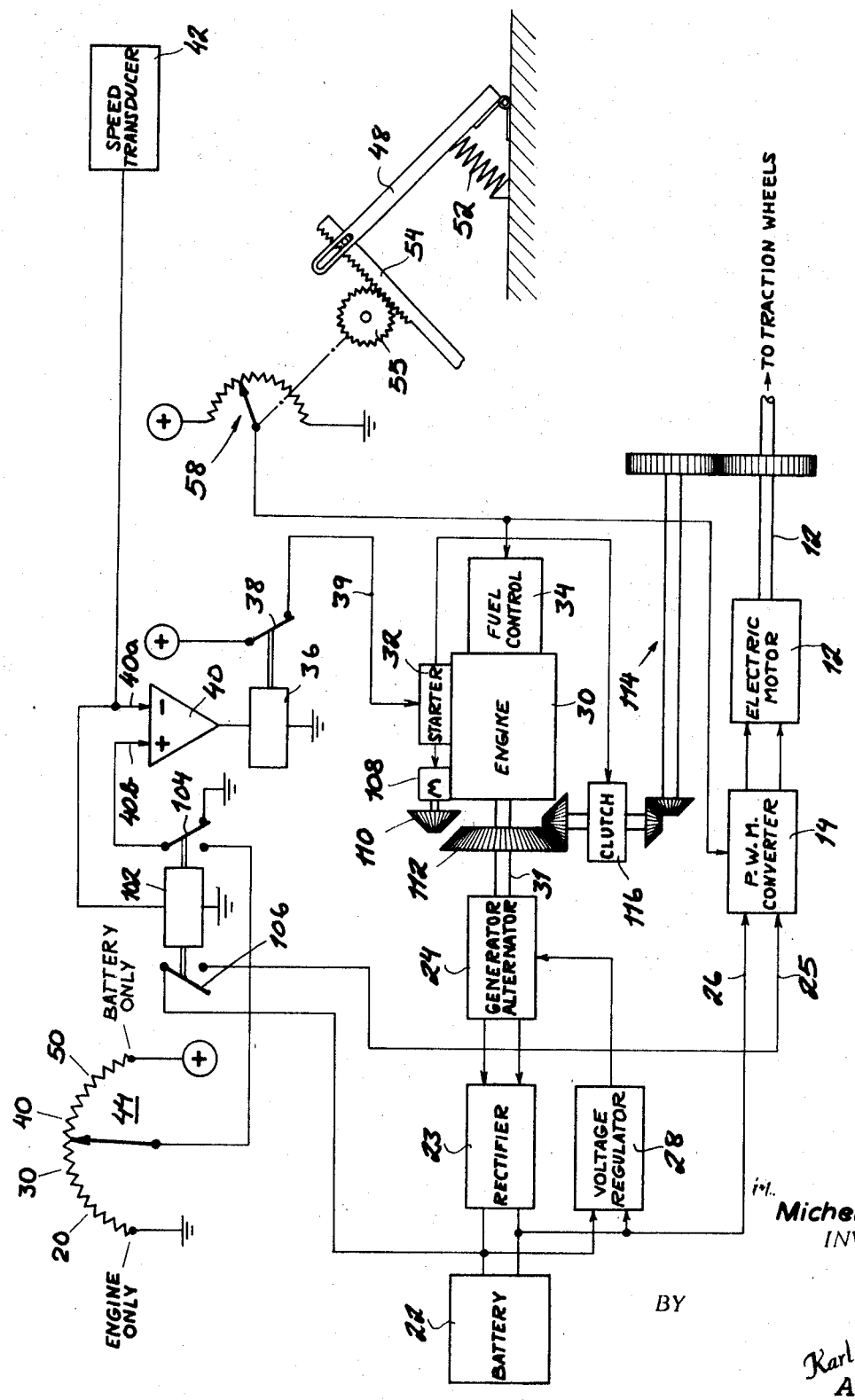

The invention will be described in greater detail hereinafter with reference to the accompanying drawing in which FIGS. 1, 2 and 3 diagrammatically illustrate three representative embodiments.

In FIG. 1 I show an electric motor 10 which drives a shaft 12 forming part of the power train coupled to the traction wheels of a vehicle not further illustrated. Motor 10 is energized over input leads 16 and 18 from a pair of bus bars 25 and 26 via a current-regulating converter 14 which may be of the pulse-width-modulated type. Converter 14 has a modulating input connected via a line 20 to a driver-operated source 58 of variable voltage, here shown as comprising a potentiometer 56 connected between positive voltage and ground. Bus bar 25 originates at the positive terminal of a battery 22 which also feeds the other points of positive potential, as diagrammatically indicated in the drawing. Bus bar 26 is grounded, as is the negative terminal of battery 22. As noted above, this battery consists advantageously of a set of cells of the air/zinc type with cathodes of a material (e.g., platinized carbon) adapted to catalyze the interaction of atmospheric oxygen with an electrolyte (e.g., an aqueous solution of potassium hydroxide or sodium chloride) in which the zinc anodes are soluble as is well known per se. The cathodes may be forcibly aerated by a small blower driven from the battery itself.

Bus bars 25 and 26 are also connected, through a rectifier 23, across the output of an electric current generator 24 designed as an alternator; if a DC generator were used, rectifier 23 would of course be omitted. A feedback circuit extends from the bus bars 25, 26 through a voltage regulator 28 to a control input of generator 24 to maintain its output voltage substantially constant at a value approximately equaling the open-circuit voltage of the battery terminals or exceeding it by a few volts.

Generator 24 can be driven, by means of a shaft 31, by a conventional internal-combustion engine 30 which may be of the reciprocating or the rotating (gas-turbine) type. Engine 30 is provided with an automatic starter 32 and a fuel-control mechanism 34 designed to vary its power and operating speed. The starter 32 is controlled by a relay 36 which, when energized, attracts an armature 38 to open a normally existing connection from positive battery to a conductor 39 leading to the starter. Relay 36, in turn, responds to the output of a comparator 40 having two inputs 40a and 40b. Input 40a is energized from a speed transducer 42, such as a tachometer, which is mechanically coupled with one of the wheels of the vehicle to generate an output voltage proportional to the vehicular velocity. Input 40b receives a reference voltage from a manually adjustable potentiometer 44 including a wiper arm 46 coacting with a dial which may be calibrated in terms of vehicle speed, e.g., kilometers or miles per hour, and whose resistance element 47 is connected between ground and positive battery. As noted in my prior application identified above, the connection between battery 22 and potentiometer 44 may include means such as a Zener diode for stabilizing the potentiometer voltage regardless of possible variations in the output voltage of the battery.

As further described in my prior application, the comparator 40 has an output (in the form of a positive voltage) only when the output voltage of transducer 42 is less than that of potentiometer 44, i.e., when the vehicle speed is below the threshold selected with the aid of wiper 46. Thus, as the wiper is placed in its extreme left-hand position, the output of the comparator will always be zero so that relay 36 is never energized and the starter 32 is at all times operational; in the extreme right-hand position of the wiper, the reference voltage on input 40b is never less than the output voltage of transducer 42 so that armature 38 remains attracted and the engine 30 cannot be started. In less sophisticated systems, of course, potentiometer 44 may be replaced by a fixed potential source establishing an invariable speed threshold.

An accelerator pedal 48 is mounted in the usual manner on the floor 50 of the vehicle, ahead of the driver's seat, so as to be depressible against the force of a restoring spring 52. A rack 54 linked with that pedal meshes with a pinion 55 on a shaft 57 which carries the wiper arm 59 of potentiometer 58. Thus, as the driver steps on the pedal 48, shaft 57 is rotated in a sense, here shown as clockwise, modifying the potential on lead 20 which is connected to an input of fuel control 34 as well as to the modulating terminal of converter 14, it being assumed that units 14 and 34 are designed to respond to a lowering of this potential with an increase in the current flow on leads 16,18 and an acceleration of engine 30, respectively. The potential of potentiometer 58 derived from the live (here positive) terminal of battery 22 may, of course, be stabilized in the same manner as that of potentiometer 44.

The system so far described operates in the same way as that shown in my prior application. When the vehicle moves at a relatively low speed, less than that selected with the aid of potentiometer 44, relay 36 is energized so that contact 38 is open and starter 32 is disabled. Since this starter also controls the ignition of the engine 30, the latter will be positively cut off even if it had been previously operated. Thus, generator 24 is inactive and motor 10 is driven exclusively by the electric energy stored in battery 22. When the vehicle thereupon accelerates to a velocity which equals or exceeds the selected threshold, relay 38 is released so that starter 32 activates the engine 30 which thereupon powers the generator 24 to recharge the battery 22 while driving the motor 10 via rectifier 23.

In accordance with my present improvement, I provide a pressure accumulator 60 which, with the engine 30 operating, can be loaded by an air compressor or pump 62 driven from shaft 31 via gears 64, 66 to deliver high-pressure air to an inlet port 68 of a three-position valve 70. This valve, which normally cuts off a conduit 72 leading to pressure accumulator 60, also has an outlet port 74 connected to an air turbine 78 whose output shaft 80 is coupled with the vehicular drive shaft 12 through an overrunning clutch 82 and a pair of gears 84, 86. A further port 76 of valve 70 is connected to conduit 72 through a valve 88 which is controlled by a pressure sensor 90 to connect this port with an outlet 92 if the pressure accumulator 60 is fully charged, thereby reducing the load on the engine 30. The outlet 92 could be used to supply cooling air to the engine in addition to or instead of the conventional fan. Valve 88 is bypassed by a line including a check valve 91 allowing for the discharge of tank 60 through valve 70 independently of the position of valve 88.

The shaft 57 of pinion 55 carries a further switch arm 94 which, on standstill and at very low speeds, is connected to the positive battery terminal through an armature 99 and back contact of a relay 98 energizable by the output of transducer 42. Upon depression of the accelerator pedal 48 to a bottom position, switch arm 94 engages a bank contact 96 to shift the valve 70 in a sense (i.e., to the left) letting the compressed air from accumulator 60 enter the turbine 78 to drive the shaft 12. This operation is possible, of course, only as long as the relay 98 is deactivated; as soon as the vehicle has gathered enough speed to let the output of transducer 42 operate the relay 98, its armature 99 disconnects positive potential from switch arm 94 so that valve 70, under the influence of restoring springs not shown, returns to normal. Upon a subsequent changeover to engine driving as the vehicular velocity surpasses the threshold selected by wiper 46, the release of relay 36 energizes the conductor 39 which causes a shifting of valve 70 in the opposite direction (to the right). Compressor 62, driven from the output shaft 31 of engine 30, now reloads the pressure accumulator 60 with atmospheric air until the pressure sensor 90 shifts the valve 88 to cut off the charging of this accumulator at a certain pressure level. Owing to the interposition of overrunning clutch 82, turbine 78 is not driven by the rotating shaft 12.

When the vehicular velocity drops below the threshold so that engine 30 stops and battery 22 takes over, the de-energization of conductor 39 again causes a restoration of valve 70 to normal so that air cannot leave the accumulator 60. This ensures that sufficient air pressure will always be available for restarting the vehicle or for assisting the battery at very low speeds. If the supply of compressed air should become exhausted for any reason, wiper 46 would have to be turned completely to the left so that, upon the application of electric power to the system by the operation of a start key or switch not shown, engine 30 immediately springs into action to recharge the accumulator 60 and, if necessary, the battery 22. Naturally, the power train leading from motor 10 to the traction wheels may include the usual manual or automatic shifting means enabling the shaft 12 to be decoupled from the wheels in a neutral position so that activation of the engine does not necessarily result in an immediate propulsion of the vehicle. Withdrawal of the start key, or opening of a master switch, disconnects the positive battery terminal from the rest of the system.

In FIG. 2 I have shown the same basic system as in FIG. 1 with omission of the pneumatic accumulator 60 and associated elements. Relay 97 has been replaced by a relay 102 directly energized from the output of speed transducer 42 when the vehicle is in motion, an armature 104 of this relay normally interrupting the connection from potentiometer wiper 46 to comparator input 40b. Another armature 106 of relay 102 disconnects, in the unoperated condition of that relay, the input lead 25 of converter 14 from the positive terminal of battery 22 so that the battery cannot drive the motor 10 until the speed of the vehicle and therefore the potential of the output lead of transducer 42 has risen sufficiently to operate the relay 102. Up to that point, i.e., on standstill or at very low speed, relay 36 is also unoperated so that lead 39 is energized (upon insertion of the start key and/or closure of the starting switch) to activate the engine 30 through the starting circuit 12. Relay 102, attracting its armatures when the vehicle has attained a certain minimum velocity, enables the comparator to operate in the aforedescribed manner to actuate the relay 36 in the range of low speeds in which the battery 22 drives the motor to the exclusion of engine 30. As the speed finally reaches the threshold of switchover to engine drive, relay 36 releases and the system functions in the manner described above.

In FIG. 2 I have further shown a small electric motor 108 which, in the well-known manner, is operable by the starting circuit 32 to advance its pinion 110 into meshing engagement with gear 112 keyed to shaft 31, this shaft being also directly entrainable by drive shaft 12 through the intermediary of a gear train 114 and a normally released clutch 116. Starter 32 includes a timing device which, when triggered, first energizes the clutch 116 so that the engine shaft 31 can be set in motion without intervention of the start motor 108 if the vehicle is moving. If the engine shaft 31 does not reach a certain speed within a relatively short period, start motor 108 is cut in to drive that shaft until it is switched off by a speed-sensitive controller in starter 32. In this way, battery 22 need not be drained for starting the engine if kinetic energy is available for this purpose. Naturally, the arrangement just described can also be used in the system of FIG. 1.

The system of FIG. 3, which has been illustrated only in part and for the rest is similar to that of FIG. 1, comprises an ancillary battery 122 of the high-discharge-rate type, and of considerably lower storage capacity than the main battery 22, in lieu of the mechanical force storer 60. In the unoperated condition of relay 98, its armature 99 in series with switch arm 94 energizes a further relay 126 when the operator depresses the pedal 48 (FIG. 1) sufficiently to close the circuit through bank contact 96. An armature 128 thereupon completes a connection from the positive terminal of battery 122 to bus bar 25, shunting a diode 124 through which this battery can be recharged from generator 24 (FIG. 1) via rectifier 23 but which normally prevents a discharge of battery 122 into battery 22 or in parallel therewith into converter 14. Thus, the power of battery 122 is available only at standstill or very low speed for the purpose of supplementing the energy output of main battery 22.

Although the systems described above are particularly useful with engines of the internal-combustion type, the principles of my invention are not limited to such use and could be employed, for example, with steam engines under conditions where smoke generation in urban areas is to be minimized.

I claim:

1. In a vehicle having a power train for the propulsion thereof, an engine, electrochemical storage means for electrical energy, an electric motor connected to be energized by said storage means, and coupling means for establishing alternate driving connections to said power train from said electrochemical storage means via said motor and from said engine, the combination therewith of speed-responsive control means for maintaining said engine deactivated in a range of relatively low vehicular velocities with propulsion of said power train by said electrochemical storage means and for activating said engine in a range of relatively high vehicular velocities to drive said power train, and starting means operable on standstill of the vehicle to set said power train in motion substantially without drawing energy from said electrochemical storage means.

2. The combination defined in claim 1 wherein said engine is connected for joint actuation by said starting means and said control means at velocities lower than those of the first-mentioned range.

3. The combination defined in claim 1 wherein said starting means includes a source of stored mechanical force.

4. The combination defined in claim 1 wherein said control means is coupled with said starting means for disconnecting said electrochemical storage means from said power train upon incipient propulsion of the vehicle.

5. The combination defined in claim 1 wherein said starting means includes an ancillary electric battery of lower storage capacity and higher discharge rate than said electrochemical storage means.

6. The combination defined in claim 1, further comprising a generator of electrical energy coupled with said engine for recharging said electrochemical storage means upon said engine driving said power train.

7. The combination defined in claim 1 wherein said electrochemical storage means comprises a metal/gas battery.

8. The combination defined in claim 1 wherein said engine is of the internal-combustion type.

9. The combination defined in claim 6 wherein said electric motor is connected across the output of said generator in parallel with said electrochemical storage means, said generator and said motor intervening in the driving of said power train by said engine.

10. In a vehicle having a power train for the propulsion thereof, an engine, a generator of electrical energy, electrochemical storage means for said electrical energy, an electric motor connected to be energized by said storage means, and coupling means for establishing alternate driving connections to said power train from said electrochemical storage means via said motor and from said engine, said engine being also coupled with said generator for recharging said electrochemical storage means while driving said power train, the combination therewith of energy-storing means independent of said electrochemical storage means, loading means for said energy-storing means coupled with said engine for actuation thereby in an operative condition thereof, and switchover means operable to couple said energy-storing means with said power train for assisting in the propulsion of the vehicle by said electrochemical storage means in an inoperative condition of said engine.

11. The combination defined in claim 10 wherein said coupling means is provided with speed-responsive control means for activating said engine to drive said power train upon attainment of a predetermined vehicular velocity.

12. The combination defined in claim 11 wherein said switchover means is connected to said control means for deactivation thereby upon attainment of said predetermined velocity.

13. The combination defined in claim 10 wherein said energy-storing means comprises a gas-pressure accumulator.

14. The combination defined in claim 10 wherein said energy-storing means comprises an ancillary source of electrochemical energy.

15. The combination defined in claim 10 wherein said switchover means includes start means operable on standstill to set the vehicle in motion.

16. The combination defined in claim 10 wherein said electric motor is connected across the output of said generator in parallel with said electrochemical storage means, said generator and said motor intervening in the driving of said power train by said engine.

* * * * *

UNITED STATES PATENT OFFICE
CERTIFICATE OF CORRECTION

Patent No. 3,650,345        Dated    March 21, 1972

Inventor(s)    Michel N. Yardney

It is certified that error appears in the above-identified patent and that said Letters Patent are hereby corrected as shown below:

In the heading, line 4, "366" should read -- 336 --.

Signed and sealed this 23rd day of January 1973.

(SEAL)
Attest:

EDWARD M. FLETCHER, JR.                    ROBERT GOTTSCHALK
Attesting Officer                          Commissioner of Patents